United States Patent [19]

Wainwright

[11] Patent Number: 5,464,705
[45] Date of Patent: Nov. 7, 1995

[54] BATTERY INCORPORATING HYDRAULIC ACTIVATION OF DISCONNECT SAFETY DEVICE ON OVERCHARGE

[75] Inventor: David Wainwright, Maple Ridge, Canada

[73] Assignee: Moli Energy (1990) Limited, Canada

[21] Appl. No.: 201,349

[22] Filed: Feb. 24, 1994

[30] Foreign Application Priority Data

Apr. 8, 1993 [CA] Canada .................... 2093763

[51] Int. Cl.[6] .............................. H01M 2/20; H01M 6/14
[52] U.S. Cl. .................... 429/61; 429/66; 429/90; 429/197
[58] Field of Search .................... 429/54, 53, 61, 429/90, 66, 197

[56] References Cited

U.S. PATENT DOCUMENTS 4,788,112  11/1988  Kung ............................ 429/54
4,943,497  7/1990   Oishi et al. .
5,292,601  3/1994   Sugeno et al. .................. 429/197

FOREIGN PATENT DOCUMENTS 1-294373  of 1989  Japan .

Primary Examiner—John S. Maples
Attorney, Agent, or Firm—Lerner, David, Littenberg, Krumholz & Mentlik

[57] ABSTRACT

A novel battery construction which incorporates a disconnect safety device which is hydraulically activated by an increase in solid volume upon abusive overcharge of the battery to disconnect the cathode or anode. A rechargeable battery which comprises: (a) a $Li_xMO_2$ cathode wherein x, is equal to or less than 1.1, and M is Ni, Co, Mn or combinations thereof; (b) a carbonaceous anode; (c) an electrolyte of one or more lithium salts dissolved in one or more non-aqueous organic solvents; and (d) an internal disconnect device which activates by hydraulic means on overcharge.

22 Claims, 9 Drawing Sheets

5,464,705

BATTERY INCORPORATING HYDRAULIC ACTIVATION OF DISCONNECT SAFETY DEVICE ON OVERCHARGE

FIELD OF THE INVENTION

This invention relates to a novel battery construction that incorporates a disconnect safety device which activates on overcharge. More particularly, this invention pertains to a novel battery construction which incorporates a disconnect safety device which is hydraulically activated by an increase in solid volume upon overcharge of the battery.

BACKGROUND OF THE INVENTION

A new class of rechargeable batteries based on lithium ion or rocking chair technologies is entering the marketplace in such consumer applications as power sources for camcorders, cellular telephones, portable computers, and the like. Cells making up these batteries offer advantages over competing systems in terms of high operating voltages (>3 V), energy density, and cycle life. However, as with all stored energy devices, there are risks associated with abuse. In such lithium ion cells, a problem of ignition exists if the cell is overcharged to too great an extent beyond the recommended charging voltage. Under such circumstances, the cell can heat up, vent, and ignite unless certain safety devices are incorporated. Lithium rechargeable cells are unsafe under certain recharge conditions. Charger control is effective at providing protection, but cells can contain internal pressure activated disconnect devices as additional protection. A reliable means of activating the disconnect at a specified point during overcharge is in demand. Generated gases can be used and have been described elsewhere.

U.S. Pat. No. 4,943,497, Oishi et al., Sony Corporation, describes the problem associated with overcharging in such cells and presents a method of protection. Incorporation of an internal switch or disconnect device is used to open circuit the cell at an appropriate point during overcharge abuse. An increase in internal cell pressure is used to activate the device. Gases generated as a result of electrolyte decomposition at the cathode at elevated voltages is used as the means of pressure generation.

Oishi et al. disclose a cell having an explosion proof valve which is deformable upon increase of inner pressure of the cell to cut a connection lead which connects the valve with a generator unit contained in the cell. The supply of charging current is cut off when the inner pressure of the cell has abnormally increased. The gradual increase of the inner pressure can be effected by selecting suitable cathode active material.

The cell design disclosed in U.S. Pat. No. 4,943,497 works reasonably well in that a useful commercial product can be made that is adequately protected internally on overcharge. Gas generation mechanisms that are relied upon to activate the disconnect device are functions of cell voltage, temperature, and time. The rate of gas generation is not constant, but increases with cell voltage and temperature. Quite importantly to actual cell applications, gas generation continues with time at a given voltage and temperature. Thus, while gas generation is required to ensure safe shutdown of the cell during overcharge, prolonged gas generation must be avoided during normal operation. Otherwise the disconnect device can become triggered during normal usage as gaseous decomposition products accumulate with time, and gas pressure rises.

In practice, both requirements can be met with judicious choice of electrolytes and cathode materials. However, these restrictions prevent certain other combinations from being chosen that are advantageous for other reasons (such as cost, complexity, energy density, etc.) Also, a maximum lifetime to the disconnect functioning is imposed if gas generation is continuous in an otherwise perfectly sealed cell.

Oishi et al. disclose a cell that achieves safe shutdown on overcharge by using a combination of cathode active materials to ensure sufficient gassing occurs on overcharge. In the embodiment described, cells made with 100% $LiCoO_2$ cathode only experienced 90% failure on overcharge. Thus, under the conditions described, a satisfactory cell could not be made using 100% $LiCoO_2$ cathode.

U.S. patent application Ser. No. 927,824, now abandoned, A. Rivers-Bowerman et al. (Moli), discloses an improved cell disconnect device. The electrochemical cell has a current cutoff means for preventing current flow. The current cutoff means has a burstable vent for preventing a dangerous explosion from occurring within the cell. The current cutoff means operates upon the exertion of a pressure in excess of a first predetermined pressure. The burstable vent operates upon the application of pressure exerted directly on the diaphragm in excess of a second predetermined pressure exceeding the first predetermined pressure.

Japanese Laid Open Pat. App. No. 294373/89 (Sony Corporation) discloses void requirements for a cell with a disconnect device. The battery is constructed of a container which accommodates (a) a negative electrode consisting of a calcinated organic body, (b) a positive electrode containing $Li_xMO_2$ (where M represents at least one kind of either Co or Ni, and x is equal to or greater than 0.05 and equal to or less than 1.10), and (c) an electrolytic solution. The battery provides a cavity with a volume of 0.3 cc or greater per capacity of 1 AH.

SUMMARY OF THE INVENTION

This invention relates to a rechargeable safety battery construction which utilizes inherent net increase in solids volume, which occurs on overcharge, to activate a current disconnect safety device.

In one aspect, the invention pertains to a rechargeable battery which comprises: (a) a $Li_xMO_2$ cathode ($x \leq 1.1$, M=Ni, Co, Mn or combinations thereof), (b) a carbonaceous anode, (c) an electrolyte of one or more lithium salts dissolved in one or more non-aqueous organic solvents; and (d) an internal disconnect device which activates by hydraulic means on overcharge.

In the battery as described, electrode balance, void volume, and charging level can be selected so that the disconnect device operates during overcharge abuse prior to cell failure, but not during normal float charging or storage at high temperature.

In the battery as described, the volume of plated lithium following exhaustion of anode capacity during overcharge can be used for hydraulic activation.

In the battery as described, the cathode can be $LiCoO_2$, the anode can be a coke-like carbon, and the electrolyte can be $LiPF_6$ dissolved in equal volumes of propylene carbonate (PC) and diethyl carbonate (DEC).

The internal disconnect device can be constructed of a cathode compatible diaphragm, which bursts under a prescribed force, a cover with a vent hole positioned over the diaphragm, and a cathode compatible plate connected to the diaphragm and adapted to separate from the diaphragm under said prescribed force and disconnect the external connection to the cathode.

The invention is also directed to a method of preventing hazardous overcharge of a rechargeable battery having a cathode, an anode, and an electrolyte which comprises incorporating within the battery an electrical disconnect means which activates by hydraulic net solids expansion when overcharge beyond a predetermined point occurs, thereby electrically disconnecting the cathode or the anode.

In the method as described electrode balance, void volume and charging level are selected so that the disconnect device operates during overcharge abuse prior to cell failure, but not during normal float charging or high temperature use. The volume of plated lithium following the exhaustion of anode capacity during overcharge can be used for hydraulic activation.

BRIEF DESCRIPTION OF THE DRAWINGS

The following drawings illustrate specific embodiments of the invention but should not be construed as restricting or limiting the scope of the claims or protection in any way:

DETAILED DESCRIPTION OF SPECIFIC EMBODIMENTS OF THE INVENTION

Figure 1A:
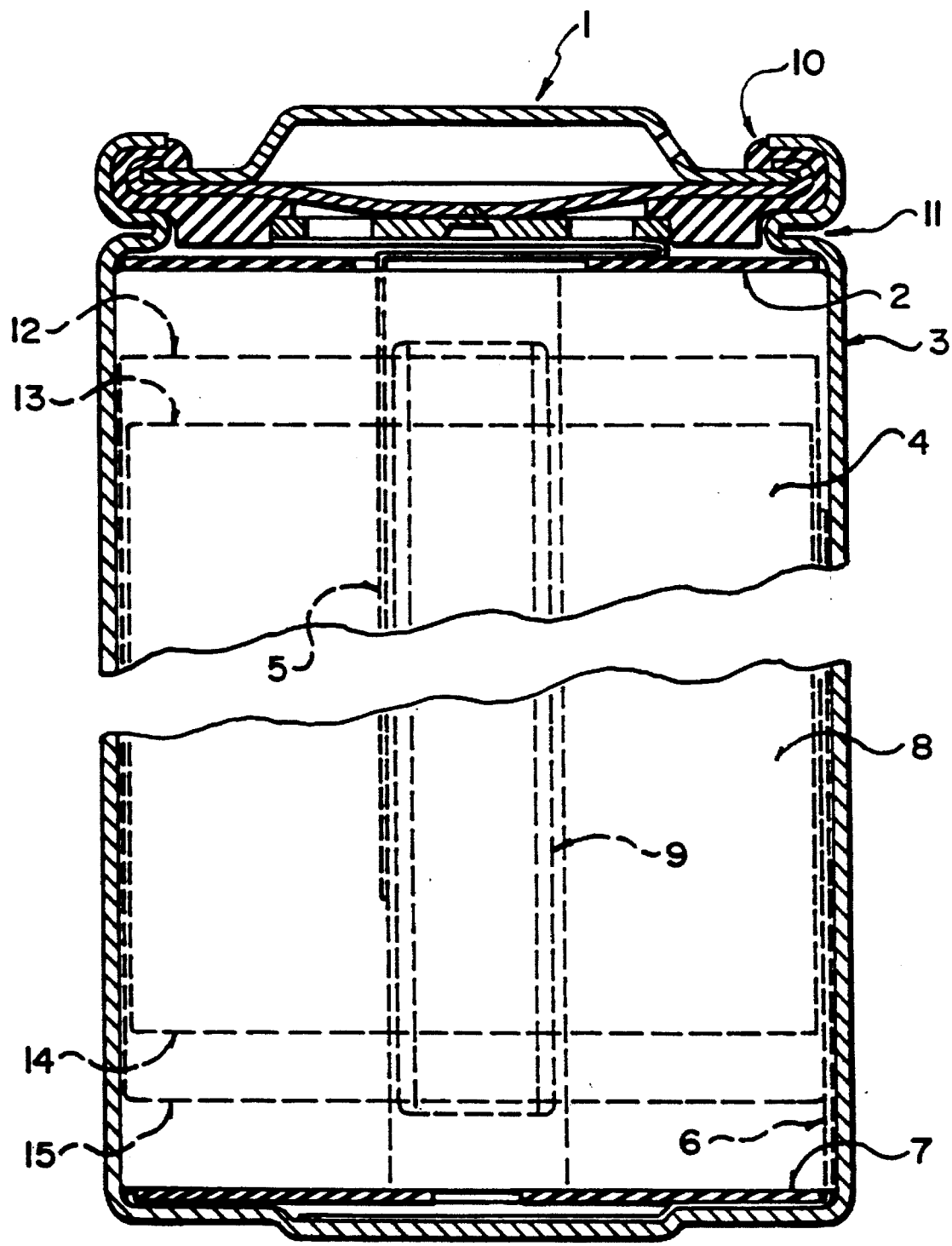
FIG. 1 illustrates a side elevation section view of the rechargeable battery with cell disconnect safety device which activates on increase in solids volume.
FIG. 1b illustrates a side section view of a header assembly.
FIG. 1c illustrates a horizontal cross-section view of the battery.

Li ion rechargeable cells (such as those commercially available from Sony Corporation) can vent violently with ensuing flame if overcharged too fast for too long (for example 2 C rate for one hour). Activation of the disconnect partway through this period (approximately ½ hour in FIG. 6) will safely shut the cell down. Depending on the cell balance (defined as the mole ratio of active cathode to anode material), the ability of the anode to contain Li on charge may eventually be exhausted. On further charge, low density Li metal begins to plate out. So while there is typically a net increase in solids volume during charge and overcharge (anode volume increase is typically greater than the cathode volume decrease), a more marked increase in volume occurs as Li is plated out. Proper choice of cell balance, absolute electrode amounts and void space in the assembled cell results in a cell whose disconnect can be activated at the desired point in overcharge and is not activated over normal operating temperature ranges or prolonged storage.

The invention disclosed and claimed herein is directed to a rechargeable safety battery which utilizes a net increase in solids volume for activation of a disconnect device. This is an important improvement over prior systems which are activated by gaseous decomposition. Reliability is gained because decomposition occurs to some extent during normal cell operation and the rate is greatest during float charging at high temperatures. Thus, time and cell history affect the gas background. Conversely, the solids volume is mainly a function of the state of charge and is not significantly affected by time or cell history. Thus, the reliability in normal and abuse situations together can be improved. In addition, even for a given cell history, it is difficult to engineer the decomposition such that adequate gassing occurs for protection, yet not too much occurs for normal use.

Since gaseous decomposition products are not required for the activation function, a larger range of electrochemical systems can be chosen. The invention has immediate application to Li ion rechargeable cells, but is not fundamentally limited to this type of cell.

The subject invention relies on the material properties of the components, in particular the volume occupied as a function of temperature and state of lithiation (or charge) to activate a disconnect device in a lithium ion type cell. As a result, the generation of gas is not required. The life of the cell can be maximized by reducing the electrolyte decomposition to a minimum. Also, time is not an important factor in the activation mechanism of the disconnect, allowing a wider range of options in the choice of electrolyte and cathode.

Description of Battery Construction

The batteries according to the invention are constructed using intercalation compounds for both the active electrode materials. Compounds with the formula $Li_xMO_2$, where $x<1.1$ and M is one or more transition metals, are used as the cathode while a carbonaceous material such as coke, graphite, pitch and the like, are used as the anode. These materials are used in powder form with particle sizes mainly in the range of 1–50 μm and are mounted on current collecting substrate foils using a suitable binder material. For purposes of making electrical contacts, a conductive dilutant, either graphite or carbon black, is generally mixed in with the active electrode material and binder.

In the cells constructed for demonstration in the Examples which follow, cathode foils were prepared using $LiCoO_2$ powder obtained from Nihon Kagaku, KS15 graphite obtained from Lonza as the conductive dilutant, and polyvinylidene fluoride (PVDF) powder from Kureha as the binder. A slurry of these components was prepared using a suitable amount of N-methyl-pyrrolidone (NMP) as the solvent in a ratio 91:6:3 parts by weight of $LiCoO_2$:graphite:PVDF. The slurry was then coated onto both sides of an aluminium foil substrate (~20 µ thick), dried and then compressed such that a loading of 25 ½ mg/cm² of solids was applied to each side with a total resulting electrode thickness of 180 µ.

Similarly, anode foils were prepared using mesocarbon microbeads (MCMB) carbon as the primary anode material obtained from Osaka Gas, Super S (Trade-mark) carbon black from Ensagri as an additional conductive dilutant, and PVDF powder from Kureha as the binder. A slurry was prepared from these materials in the ratio 88:2:10 parts by weight of MCMB:Super S: PVDF again by dissolving in a suitable amount of NMP solvent. This slurry was then coated on both sides of a .copper foil substrate (~10 µ thick), dried and then compressed such that a loading of 12 mg/cm² of solids was applied to each side with a total electrode thickness of 200 µ.

Dry cell assemblies were then prepared by spirally winding an anode and cathode segment together into a "jelly roll" with two microporous Celgard 2400 (Trademark) film sheets present as separators. Typically, anode and cathode segments were 41 cm long by 57 ½ mm wide and 37 cm long by 54 ½ mm wide respectively. The jelly roll was then inserted into a conventional "4/3A" size battery container. (66.4 mm high, 16.6 mm OD). Appropriate insulating pieces were included and appropriate tab connections were made to the cell case and header.

The header used was of special construction that incorporated a pressure relief vent and a pressure operated disconnect device. This header is the subject of a copending patent application (U.S. patent application Ser. No. 07/927, 824). The disconnect pressure was set at ~150 psi, while the pressure relief vent was set to open at ~350 psi.

Electrolyte was added in several increments to activate the battery. In the following examples, a 1M solution of $LiPF_6$ dissolved in equal volumes of PC and DEC was used as an electrolyte. Typically 5.9 g of solution was added. The header was then crimp sealed in place using conventional means.

Description of Invention in Relation to Drawings
FIG. 1a shows a side section view of a specific cell construction according to the invention. As illustrated in FIG. 1a, in section view, a battery can 3, typically constructed of nickel plated steel, has a header assembly 1 at the top thereof. The header 1 and can 3 are sealed by seal 10. An insulating disk 2 is located immediately below the neck portion 11 immediately under seal 10 and header assembly 1. A second insulating disk 7 is positioned above the base of the can 3. A jelly roll assembly 4, constructed as described below in relation to FIG. 1c, takes up most of the interior volume of the can 3. A cathode tab 5 is shown extending vertically in the central region of the can 3. An anode tab 6 is illustrated extending vertically in the exterior region of the can 3. The upper horizontal broken line 12 indicates the upper edge of the anode. The upper horizontal broken line 13 illustrates the upper edge of the cathode.

The lower broken horizontal line 14 illustrates the lower edge of the cathode. The lower horizontal broken line 15 illustrates the lower edge of the anode. The electrolyte 8 is indicated generally within the interior of the can 3. The vertically extending spacer 9 is indicated in the central area of the can by broken lines.

Figure 1B:
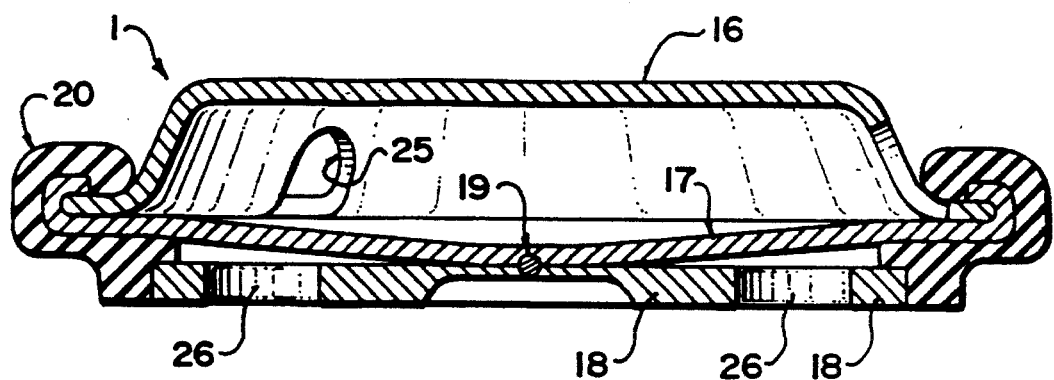

FIG. 1b shows a detailed side section view of the header assembly 1 used in the cell construction of the invention. As illustrated in FIG. 1b, an external metal cover 16 is crimped at the periphery by an electrically conductive diaphragm 17.

The diaphragm 17 must be constructed of a cathode compatible material, such as aluminum, in this case. A thin-walled grooved area is included in the diaphragm 17 design to burst upon application of sufficient physical force thereto. The diaphragm 17 thus acts as the pressure relief vent.

The cover 16 is typically constructed of stainless steel and incorporates a vent hole 25 of some kind to allow the escape of gas and/or liquid in the event that the pressure relief vent is activated.

The diaphragm 17 is further electrically connected to an aluminum plate 18 by a critical weld 19. An electrically insulating gasket 20 positions the plate 18 with respect to the diaphragm. The gasket 20 electrically separates the positive header assembly 2 from the negative can 3. Additionally, the gasket 20 is used to provide a seal between the cell contents and the outside environment.

The cathode tab 5 (see FIGS. 1a and 1c) is attached to the plate 18 at a site other than that of the critical weld 19. The plate 18 includes in it holes 26 to allow the flow of liquid through it for purposes of applying physical force to the diaphragm 17. The plate 18 is effectively fixed in position with reference to the gasket 20. Upon application of sufficient internal force to the diaphragm 17, via holes 26, the critical weld 19 is broken. The diaphragm 17 is then free to move away upwardly from the plate 18. When this occurs, the electrical path between the outside positive cover 16 and the plate 18 is broken thereby providing a pressure disconnect function.

Figure 1C:
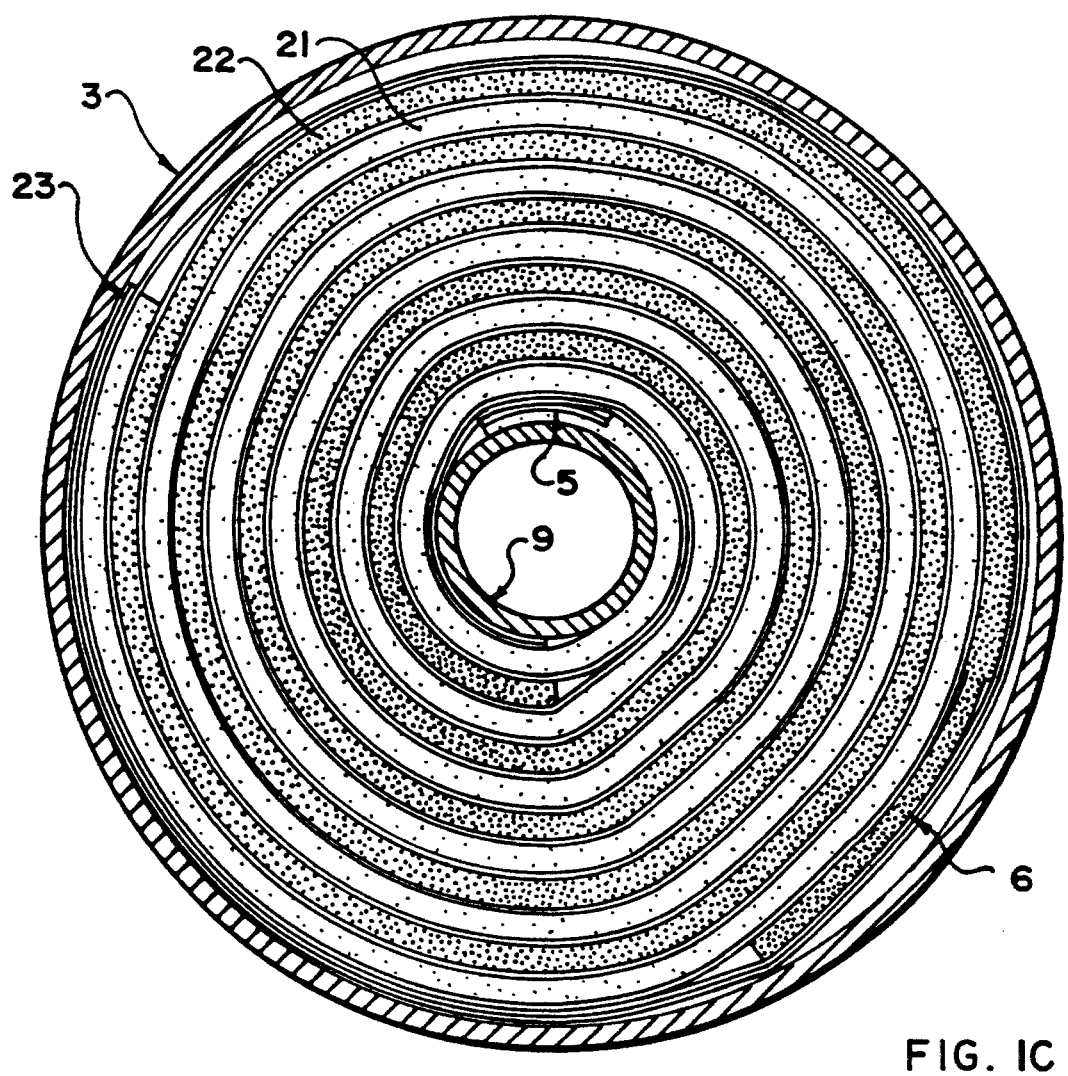

FIG. 1c shows a detailed horizontal cross-section view of the cell. The helical jelly roll structure consisting of the cathode 21, anode 22 and separator 23 is illustrated. Also indicated are the can 3, spacer 9, cathode tab 5 and anode tab 6.

Cells such as these are capable of delivering large capacities for many cycles. This specific design is rated to deliver 800 mAh capacity (100% DOD) at 400 mA (C/2) discharge rates over the cell lifetime following a fast ~2 hour charge period to a 4 V cut-off. The maximum charge current of a charger for such a cell was taken to be 1.6 A (2 C) rate. Thus, for purposes of testing these experimental batteries, overcharge testing was performed at a constant 2 C rate until safe shutdown or cell failure was accomplished.

For purposes of effecting the desired result of hydraulic activation of the disconnect device, many factors must be considered. In the preceding description, and in the examples which follow, the choice of materials, electrode construction and operating conditions were made initially without consideration for disconnect activation. It was then possible to accomplish both performance and activation objectives simply by varying the void volume in the cell. However, it will be obvious to those skilled in the art that other choices of materials, electrode construction and/or operating conditions may require the adjustment of other parameters. Thus, not all these parameters can be varied independently and still be compensated for simply by void adjustment. It is the intended scope of this disclosure, and the following claims to cover all possible battery constructions whereby the volume of plated lithium following the exhaustion of the anode capacity during overcharge is used for hydraulic activation of the disconnect.

As fabricated, at a given temperature, cells according to the invention generally are in a state with maximum internal void. Upon charging, lithium atoms are moved from the cathode host to the anode. Generally, the net electrode solids volume increases during this process. While the volume occupied by the cathode is often (but not always) reduced as lithium is extracted, the volume occupied by the anode increases as lithium is inserted. The net change in volume is usually positive on charge. Close to a reversible situation exists on subsequent discharge-charge cycles. In principle, a battery construction can be envisaged that uses this net volume increase to hydraulically activate a disconnect at any desired point during normal charge, or preferably during an overcharge situation.

It is, however, important to recognize that the battery must be capable of operation over wide temperature ranges, typically 0° C. and up to 60° C. The net volume of the contents generally increases more rapidly than the internal volume of the container as temperature is increased. Thus, it is important to engineer the battery such that hydraulic activation does not occur as a result of using the battery at normal elevated temperatures. In practice, the net volume increase as the temperature is raised over this normal operating range is similar to the net volume increase seen in the electrode components during charge. Thus, it is difficult to achieve both performance and hydraulic activation goals in this way.

The situation changes, however, if the anode capacity is exhausted at an appropriate time during overcharge. At this point, the anode is no longer capable of intercalating lithium and lithium metal deposition must occur on the anode instead. The rate of net volume change increases markedly at this point since lithium metal is significantly less dense than the corresponding Li-carbon intercalation compound per unit lithium. Compare the rate of lithium intercalated graphite expansion which goes roughly as 3.3 cc increase in volume per mole Li intercalated (derived from $Li_xC_6$ lattice parameter data presented in *Phase diagrams of $Li_xC_6$* Phys. Rev. B 1991 Vol. 44, No. 17, J. Dahn (page 9170)) versus a 13 cc increase in volume per mole of Li plated. If the battery is engineered such that lithium plating occurs in overcharge situations prior to cell failure with ignition, it becomes possible in practice to use the associated net volume increase to activate the safety disconnect.

A necessary condition, then, is that the lithium capacity of the cathode must exceed that of the anode. The ratio $$\frac{\text{moles of cathode}}{\text{moles of anode}}$$

is called the balance.

The batteries described in this disclosure have a preferred balance of approximately 1.5. Generally, the upper capacity limit on carbonaceous anodes is taken as 1 mole of Li per $C_6$. However, this limit is less for coke like carbons and can be greater for modified carbons such as certain boron substituted carbon materials. Thus, the preferred balance will depend greatly on the materials used for the electrodes. Another necessary condition is that the lithium available for plating must exceed the void volume in the cell plus whatever additional volume is necessary to activate the disconnect.

It will be recognized that the net volume of the contents of the battery will be a function of all factors that influence the relative volume of any component including material choice, temperature, state of lithiation, and relative amounts of the components. Those skilled in the art are familiar with a variety of factors that make it difficult to predict the exact preferred construction. These include irreversible losses of lithium that occur on the initial charge of the battery, the presence of some gaseous decomposition products even if minimized, and other factors. Normally then, fine tuning would be required using empirical methods.

EXAMPLES

EXAMPLE 1

Figure 2A:
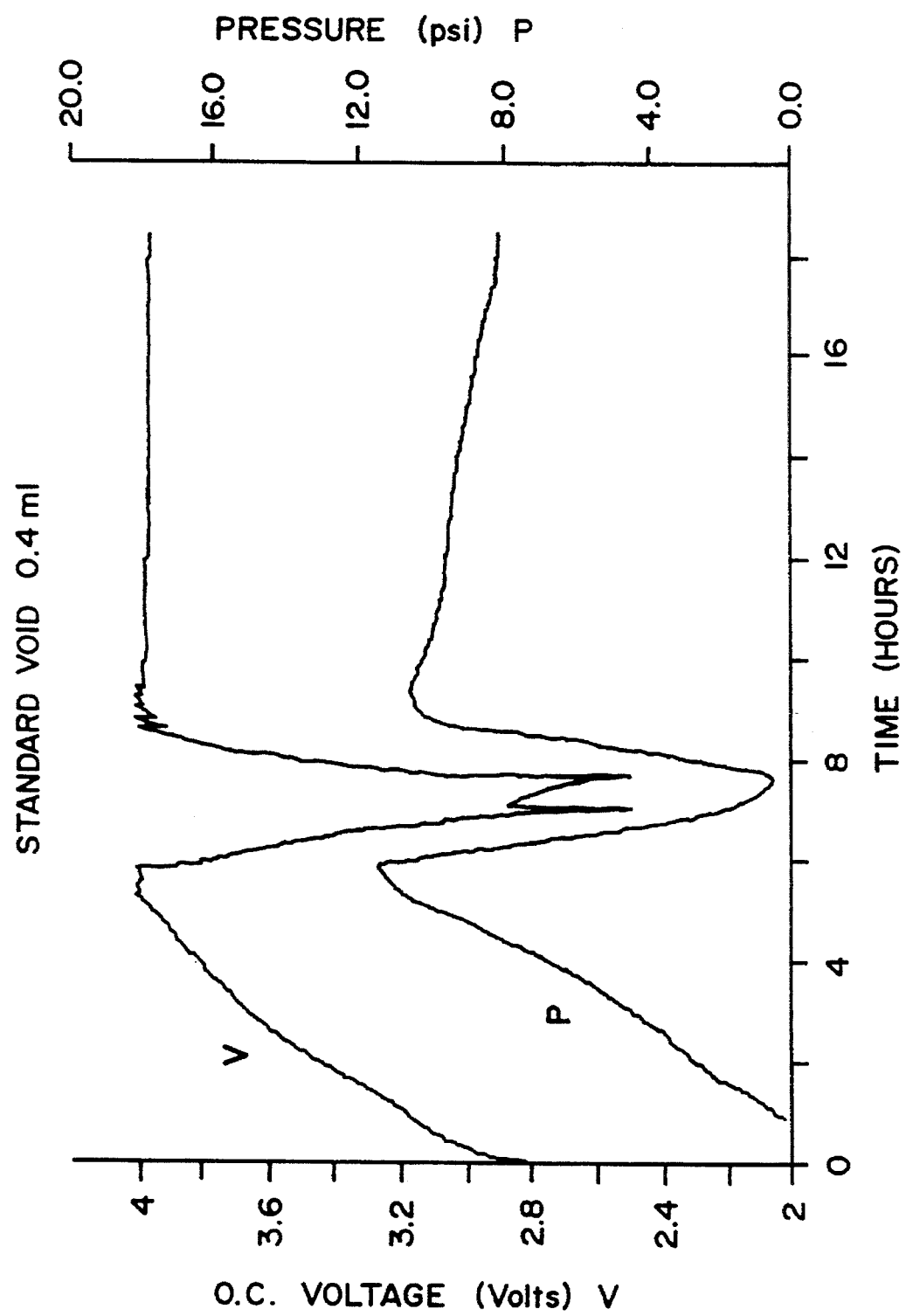
FIG. 2a illustrates a graphical depiction of cell voltage and internal pressure versus time for a battery assembled according to the invention.
Figure 2B:
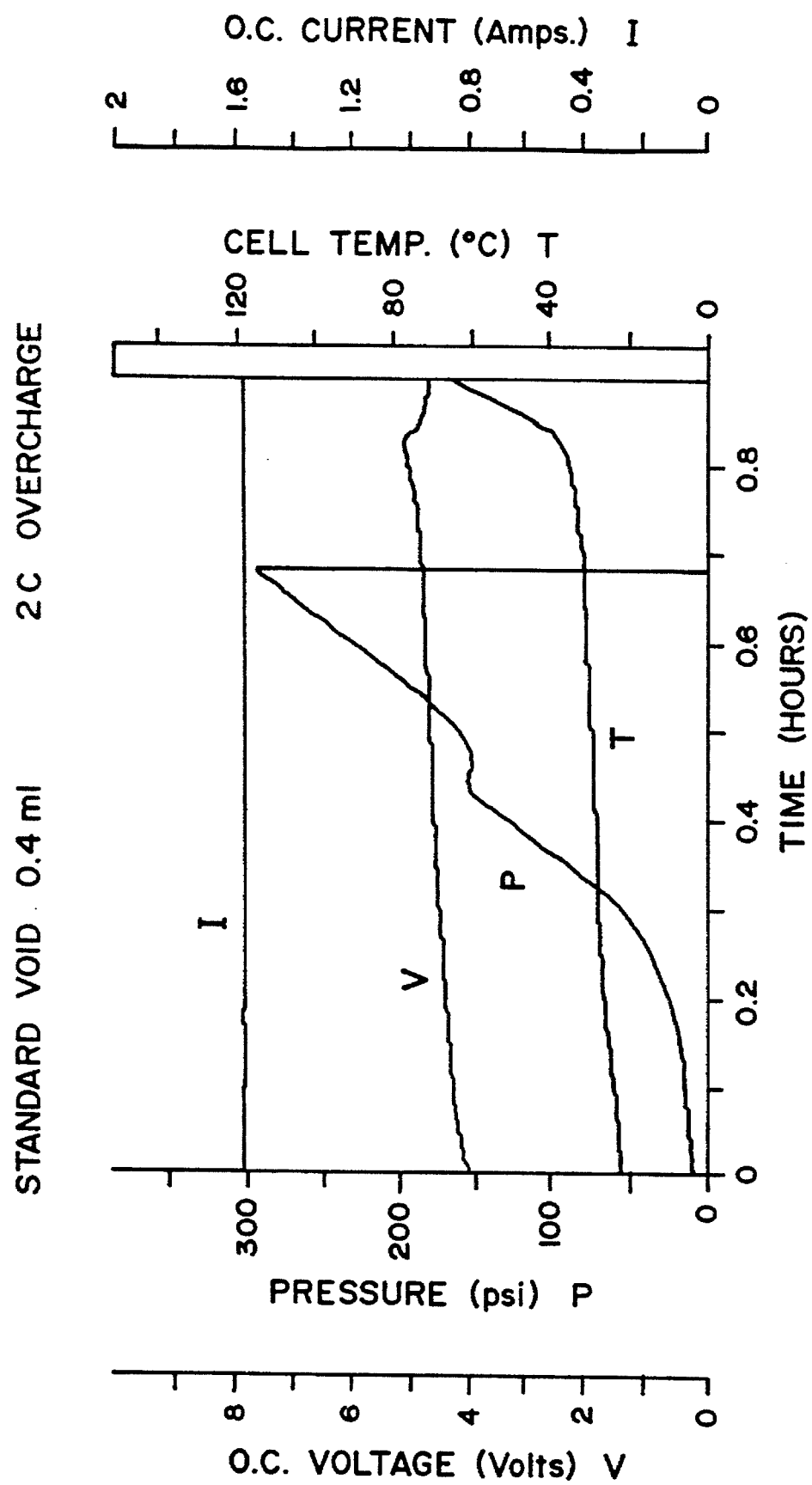
FIG. 2b illustrates a graphical depiction of cell voltage, charged current, external cell temperature and internal pressure versus time for a rechargeable battery cell which has been overcharged.

A battery was assembled as described in the preceding disclosure. The disconnect was bypassed such that the activation pressure was only slightly reduced, but would not disconnect internally. The battery was also equipped with a low volume pressure transducer attached via a small welded tube. This apparatus increased the internal cell volume by approximately 0.8 ml. The void for the entire assembly was adjusted to be 0.4 ml. The cell was charged and cycled once at 21° C. to the normal 4 V upper limit. FIG. 2a shows the cell voltage and internal pressure versus time for this cell. The cell delivered 0.87 Ah on discharge at 800 mA. The cell was then overcharged at 2 C rate at ambient temperature as described earlier. FIG. 2b shows cell voltage, charge current, external cell temperature and internal pressure versus time for the cell. The activation point of the disconnect is indicated by the dip in the pressure curve at approximately 0.45 hours. This is a result of diaphragm movement which slightly increases internal void. The pressure relief activated just before 0.7 hours. Finally, the cell ignited just before 0.9 hours into the test. Thus, had the disconnect been active, this cell would have been disabled safely.

The onset of lithium plating, based solely on the total primary electrode materials available and one mole of lithium per $C_6$ as the maximum anode capacity, would be approximately 0.3 hours into the test (i.e. Initial conditions have cathode of $Li_{0.55}CoO_2$ and anode of $Li_{0.7}C_6$. The conditions at anode exhaustion would be approximately $Li_{0.34}CoO_2$ and $Li_1C_6$). There would theoretically be a maximum of 0.34 moles of Li per mole of initial cathode available for plating, corresponding to an additional volume of about 0.4 cc for activating a disconnect.

EXAMPLE 2

Figure 3:
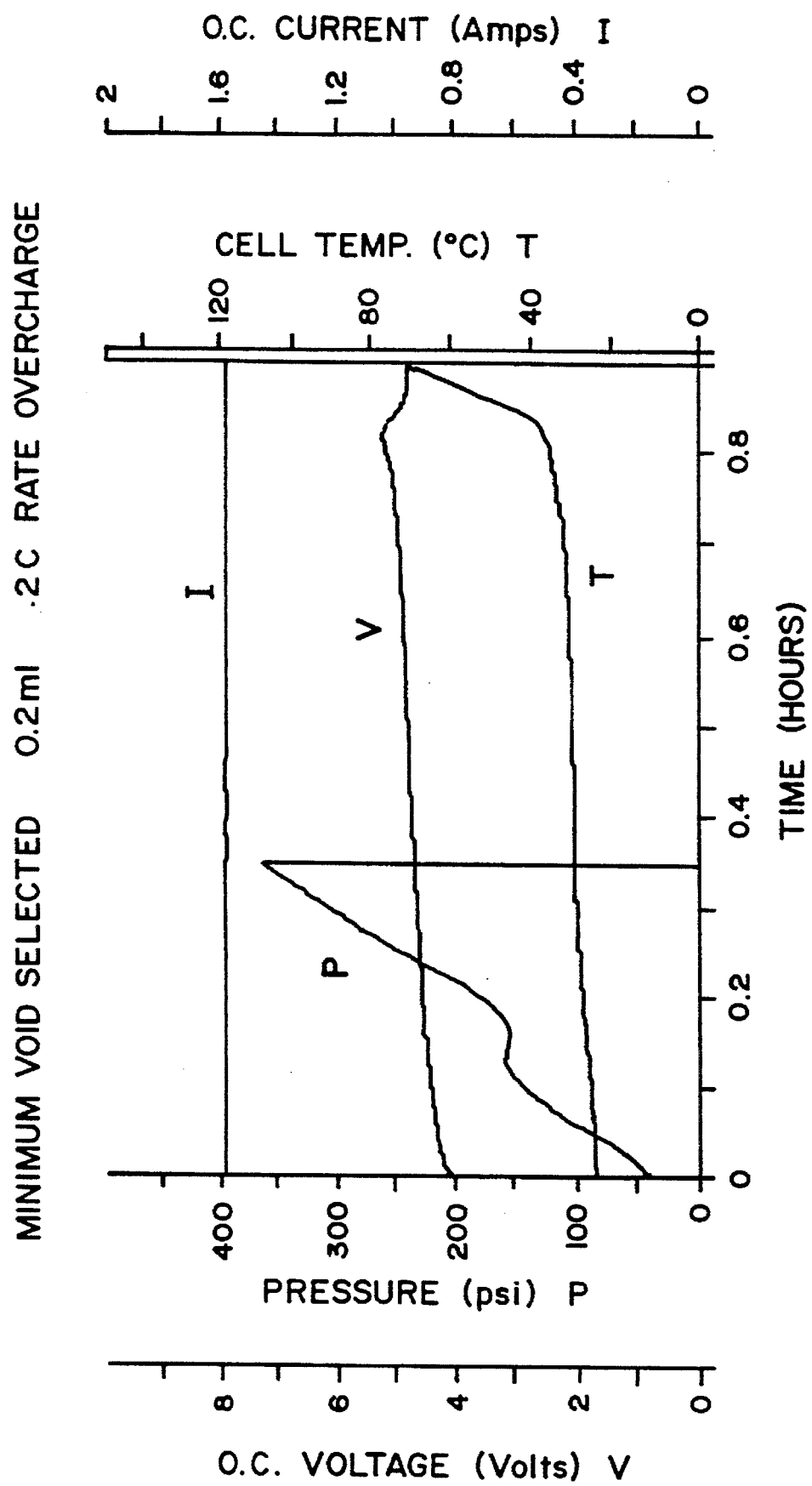
FIG. 3 illustrates a graphical depiction of cell voltage, charged current, external cell temperature and internal pressure versus time for a rechargeable battery as cycled according to a first procedure.

A battery was assembled and cycled as in Example 1, except the void was adjusted to 0.2 ml. A similar overcharge test was performed. FIG. 3 shows an earlier time to activation (0.15 hours) and venting (0.35 hours) compared to Example 1. Again, ignition occurred at about 0.9 hours into the test. Had the disconnect been active, this cell would have been disabled safely.

EXAMPLE 3

Figure 4:
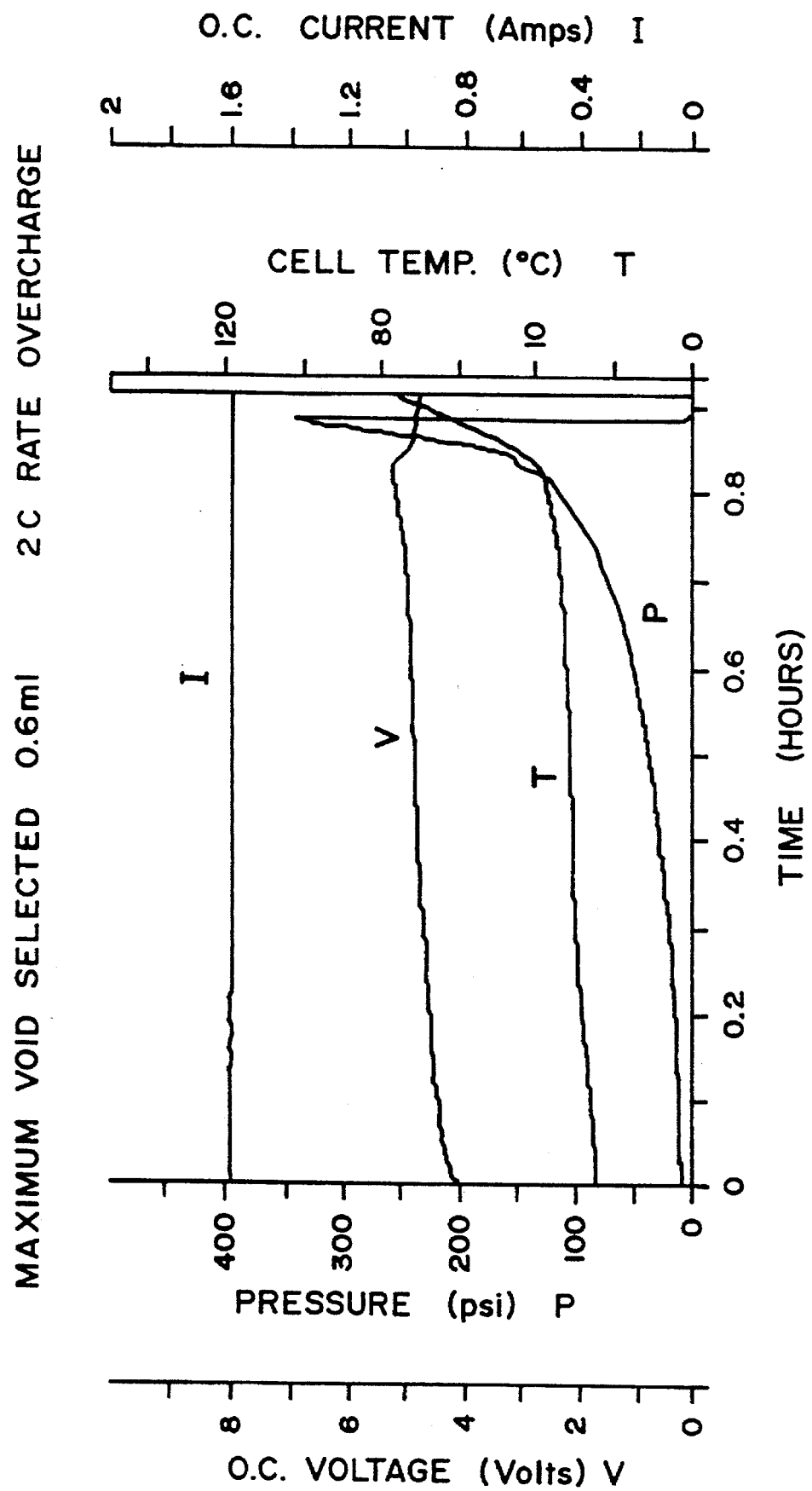
FIG. 4 illustrates a graphical depiction of cell voltage, charged current, external cell temperature and internal pressure versus time for a rechargeable battery assembled and cycled as according to a second procedure.

A battery was assembled and cycled as in Example 1, except the void was 0.6 ml. A similar overcharge test was performed. FIG. 4 shows a later time than Example 1 to activation and venting at over 0.8 hours. Again, ignition occurred just after 0.9 hours into the test.

This test shows that had the disconnect device been active, there would be insufficient margin of safety for overcharge protection. Thus, voids <0.6 ml are required in this embodiment.

EXAMPLE 4

Figure 5A:
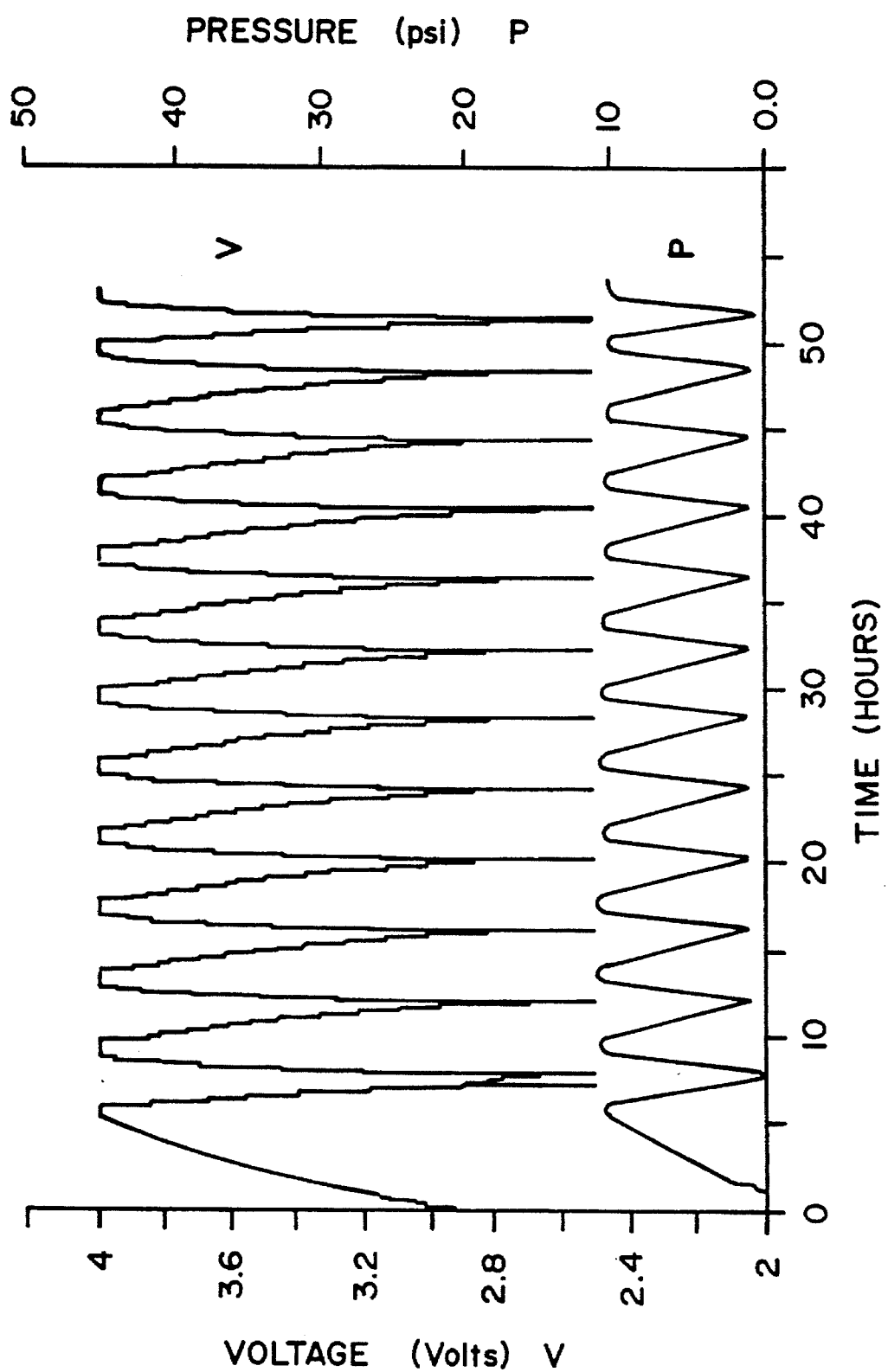
FIG. 5a illustrates a graphical depiction of voltage and pressure versus time, for a rechargeable battery which has been subjected to eleven cycles.
Figure 5B:
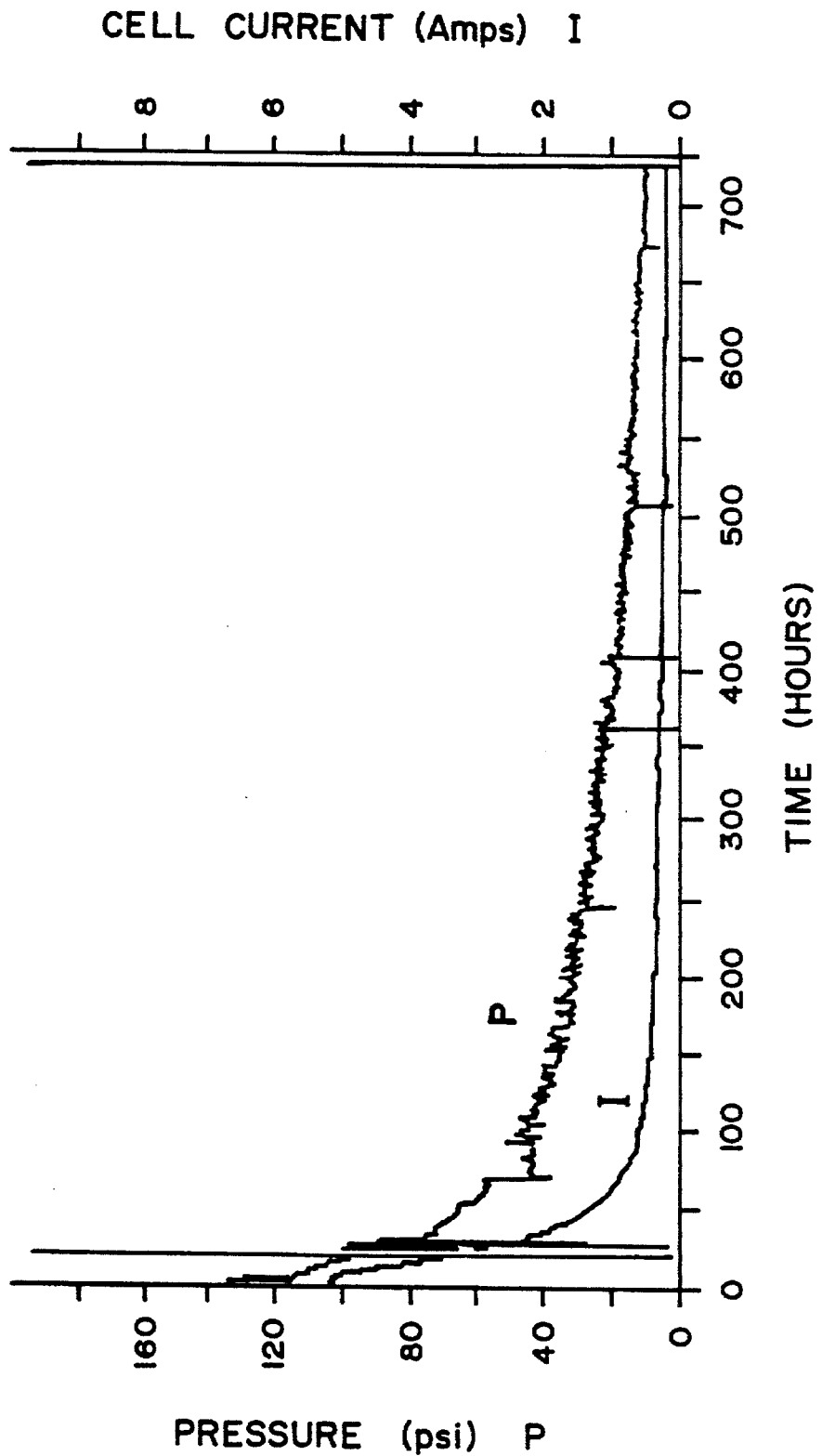
FIG. 5b illustrates a graphical depiction of pressure and float current versus time for a rechargeable battery assembled and cycled according a fourth procedure.

A battery was assembled and cycled as in Example 1. The cell was subjected to 11 additional cycles at 21° C. as shown in FIG. 5a. After this, the cell was installed in an incubator at 60° C. with the voltage held at a constant 4 V (float charged). FIG. 5b shows pressure and float current versus time. Noise on the pressure curve is a result of temperature fluctuations as the incubator door was opened many times a day.

The resulting pressure is well below the activation pressure and decreases with time. This decrease is believed to be partly a result of equilibration processes and permeation of gas through the plastic seal. The seal was most permeable to the $H_2$ generated mainly on the first charge in fresh cells. This occurs at the cathode and the source is water confined inside on assembly. While some gaseous decomposition products are probably produced, a significant pressure build-up does not occur.

EXAMPLE 5

A cell was assembled and cycled as in Example 4 except that the void was set at 0.2 ml. This cell was also installed in an incubator at 60° C. on open circuit. The relief vent activated and electrolyte leaked out within 0.2 hours of installation before float testing could even begin. The pressure could be seen to increase rapidly as a result of cell component thermal expansion. This cell therefore is unacceptable for use over the normal temperature range.

These examples illustrate that batteries can be constructed with acceptable performance and use plated Li to hydraulically activate a disconnect on overcharge.

EXAMPLE 6

Seventy-one cells were constructed as described in the specification with 0.4 ml voids and active disconnects. All cells were cycled initially as in Example 1. All cells were subjected to overcharge abuse as in Example 1. The disconnects in all cells activated well before 0.9 hours into the test. No subsequent ignition occurred.

Figure 6:
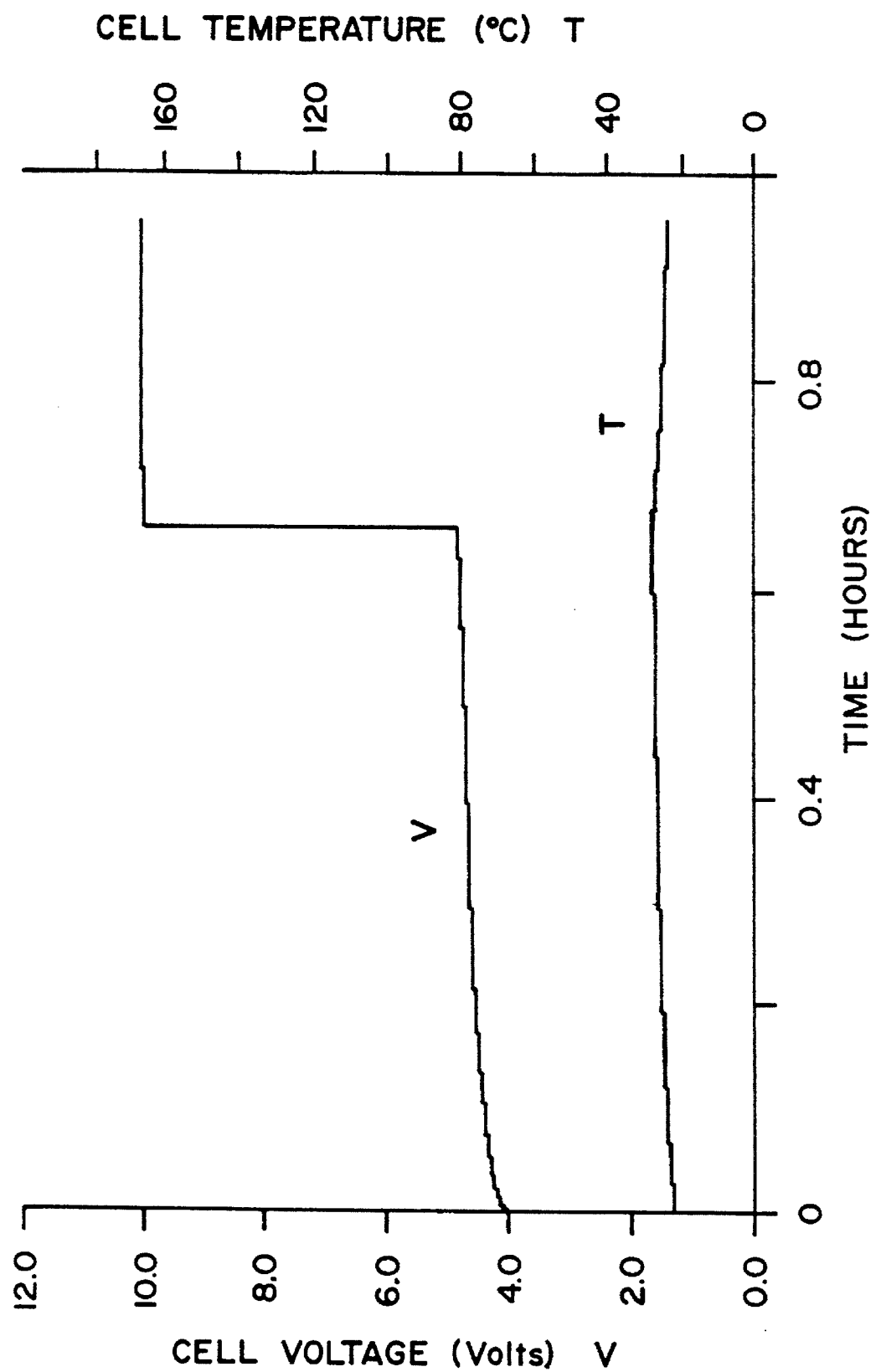
FIG. 6 illustrates a graphical depiction of voltage and external cell temperature versus time for a rechargeable battery constructed according to the invention, demonstrating reliable overcharge protection.

FIG. 6 shows voltage and external temperature for one of these cells. Activation of the disconnect occurred at about 0.65 hours. This example shows that reliable overcharge protection can be obtained using the invention batteries. These batteries incorporated $LiCoO_2$ only for the cathode.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rechargeable battery cell which comprises:
   (a) a $Li_xMO_2$ cathode wherein x is equal to or less than 1.1, and M is Ni, Co, Mn or combinations thereof;
   (b) a carbonaceous anode;
   (c) an electrolyte of one or more lithium salts dissolved in one or more non-aqueous organic solvents; and
   (d) an internal electrical disconnect device which activates by the displacement of said electrolyte resulting from the net increase in solids volume which occurs on overcharge of the battery that exceeds the liquid and solid void volume in the battery cell;
   wherein electrode balance, void volume and charging level are selected so that the disconnect device operates during overcharge abuse prior to cell failure, but not during normal float charging or storage at high temperature.

2. A battery as claimed in claim 1 wherein the volume of plated lithium following exhaustion of anode capacity during overcharge contributes to displacing the electrolyte.

3. A battery as claimed in claim 1 wherein the cathode (a) is $LiCoO_2$, the anode (b) is a coke-like carbon, and the electrolyte (c) is 1M of $LiPF_6$ dissolved in equal volumes of propylene carbonate and diethyl carbonate.

4. A battery as claimed in claim 1 wherein the internal disconnect device is constructed of a cathode compatible diaphragm, a cover with a vent hole positioned over the diaphragm, and a cathode compatible plate connected to the diaphragm and adapted to separate from the diaphragm under a hydraulic force exerted by the electrolyte against the diaphragm and disconnect an external electrical connection to the cathode, prior to battery cell failure.

5. A battery as claimed in claim 4 wherein the cathode compatible plate has therein at least one hole which enables electrolyte to pass from the interior of the battery to a plate-adjacent side of the cathode compatible diaphragm.

6. A battery as claimed in claim 4 wherein the cathode compatible diaphragm is connected to the cathode compatible plate by a critical weld.

7. A method of preventing hazardous overcharge of a rechargeable battery having a cathode, an anode, and an electrolyte which comprises incorporating within the battery an electrical disconnect means which activates by the displacement of said electrolyte resulting from the net increase in solids volume when overcharge beyond a point where liquid and solids void in the battery is exceeded, thereby electrically disconnecting the cathode or the anode; wherein electrode balance, void volume and charging level are selected so that the disconnect device operates during overcharge of use prior to cell failure, but not during normal float charging or storage at high temperature.

8. A method as claimed in claim 7 wherein the cathode is $Li_xMO_2$ wherein x is equal to or less than 1.1 and M is selected from the group of metals consisting of Ni, Co, Mn or combinations thereof, the anode is a carbonaceous material, and the electrolyte is one or more lithium salts dissolved in one or more non-aqueous organic solvents.

9. A method as claimed in claim 7 or 8 wherein the volume of plated lithium following the exhaustion of anode capacity during overcharge contributes to displacing the electrolyte to disconnect the cathode or the anode.

10. A method as claimed in claim 7 or 8 wherein the cathode (a) is $LiCoO_2$, the anode (b) is a coke-like carbon, and the electrolyte is 1M of $LiPF_6$ dissolved in equal volumes of propylene carbonate and diethyl carbonate.

11. A rechargeable battery which comprises:
   (a) a $Li_xMO_2$ cathode wherein x is equal to or less than 1.1 and M is Ni, Co, Mn or combinations thereof;
   (b) a carbonaceous anode;
   (c) an electrolyte of one or more lithium salts dissolved in one or more non-aqueous organic salts; and
   (d) an internal electrical disconnect device which is constructed of a cathode compatible diaphragm, a cover with a vent hole positioned over the diaphragm, and a cathode compatible plate connected to the diaphragm, said cathode compatible plate having therein means for enabling electrolyte in the battery to impinge against the plate-adjacent side of the diaphragm when net increase in solids volume and volume of plated lithium following exhaustion of anode capacity during overcharge of the battery exceeds liquid and solid void volume in the battery and displaces the electrolyte to cause the diaphragm to separate from the plate and thereby disconnect an electrical connection to the cathode, prior to battery cell failure, wherein electrode balance, void volume and charging level are selected so that the disconnect device operates during overcharge abuse prior to cell failure, but not during normal float charging or high temperature use.

12. A battery as claimed in claim 11 wherein the cathode compatible plate has therein at least one hole which enables electrolyte to pass from the interior of the battery to the plate-adjacent side of the cathode compatible diaphragm.

13. A battery as claimed in claim 11 wherein the diaphragm is connected to the plate by a critical weld.

14. A method of preventing hazardous overcharge of a rechargeable battery having a cathode of $Li_xMO_2$ wherein x is equal to or less than 1.1 and M is selected from the group of metals consisting of Ni, Co, Mn or combinations thereof; an anode of carbonaceous material, and an electrolyte of one or more lithium salts dissolved in one or more non-aqueous organic solvents, which comprises incorporating within the battery an electrical disconnect means which operates during overcharge abuse prior to cell failure, but not during normal float charging or high temperature use, by selection of electrode balance, void volume and charging level, which disconnect means activates by the displacement of electrolyte resulting from the net increase in solids volume which occurs on overcharge beyond a point where the liquid and solids void volume in the battery is exceeded, wherein said net increase in solids volume includes the volume of plated lithium following exhaustion of anode capacity during overcharge.

15. A method as claimed in claim 16 wherein the cathode is $LiCoO_2$, the anode is a coke-like carbon, and the electrolyte is 1M of $LiPF_6$ dissolved in equal volumes of propylene carbonate and diethyl carbonate.

16. A method for preventing the hazardous overcharge of a rechargeable battery cell comprising an anode, a cathode and an electrolyte comprising the step of disconnecting the anode or cathode of said battery in response to the electrolyte displacement resulting from the net increase in the solid volume of said battery cell on overcharging in excess of the void volume of said battery cell; wherein electrode balance, void volume and charging level are selected so that said disconnecting step occurs in response to overcharge abuse prior to cell failure, but not in response to normal float charging or high temperature use.

17. The method of claim 16 wherein said rechargeable battery cell comprises:

(a) a $Li_xMO_2$ cathode wherein x is equal to or less than 1.1 and M is Ni, Co, Mn or combinations thereof;

(b) a carbonaceous anode;

(c) an electrolyte of one or more lithium salts dissolved in one or more non-aqueous organic solvents; and (d) an internal electrical disconnect device which activates by said electrolyte displacement resulting from said net increase in solid volume occurring on overcharge of said battery in excess of said void battery cell void volume.

18. The method of claim 17 wherein the volume of plated lithium following exhaustion of anode capacity during overcharge contributes to displacing said electrolyte.

19. The method of claim 17 wherein said cathode is $LiCoO_2$, said anode is a coke-like carbon, and said electrolyte is 1M $LiPF_6$ dissolved in equal volumes of propylene carbonate and diethyl carbonate.

20. The method of claim 17 wherein said internal disconnect device is constructed of a cathode compatible diaphragm, a cover with a vent hole positioned over said diaphragm, and a cathode compatible plate connected to said diaphragm and adapted to separate from said diaphragm under a hydraulic force exerted by said electrolyte against said diaphragm and disconnect an external electrical connection to said cathode, prior to battery cell failure.

21. The method of claim 20 wherein said cathode compatible plate has therein at least one hole which enables electrolyte to pass from the interior of said battery to the plate-adjacent side of said cathode compatible diaphragm.

22. The method of claim 20 wherein said cathode compatible diaphragm is connected to said cathode compatible plate by a critical weld.

* * * * *